June 13, 1950 R. E. BEAUCHAMP 2,511,688
COMPASS
Filed March 21, 1945 2 Sheets-Sheet 1
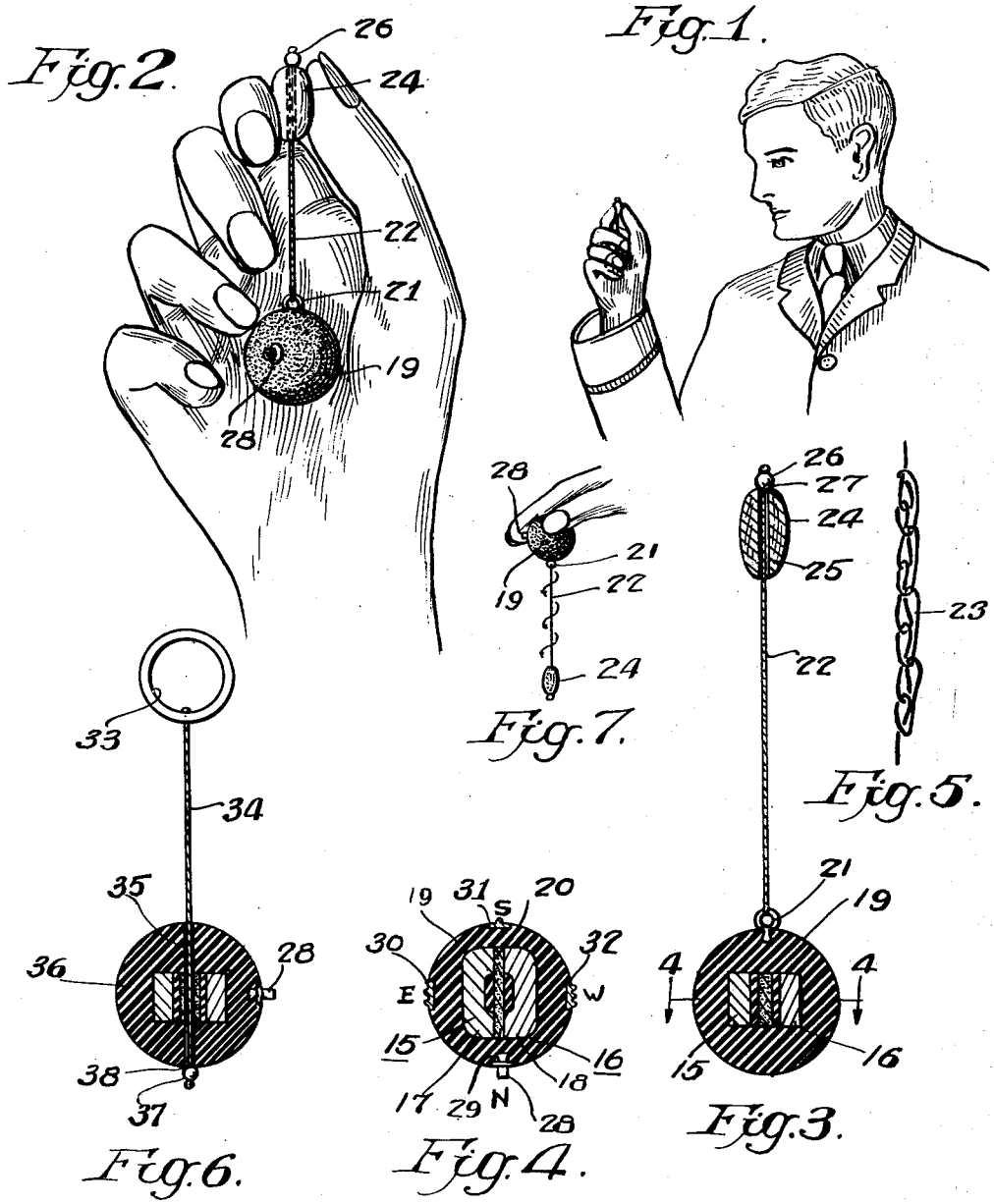
INVENTOR.
Reginald E. Beauchamp
BY
Morris Michael Marks
Attorney June 13, 1950 R. E. BEAUCHAMP 2,511,688
COMPASS
Filed March 21, 1945 2 Sheets-Sheet 2
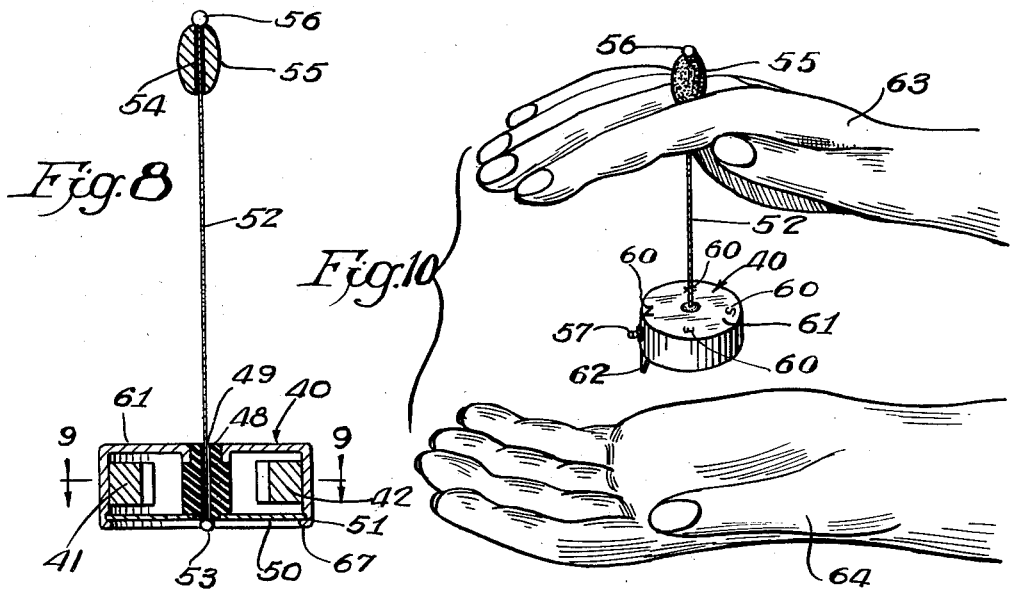
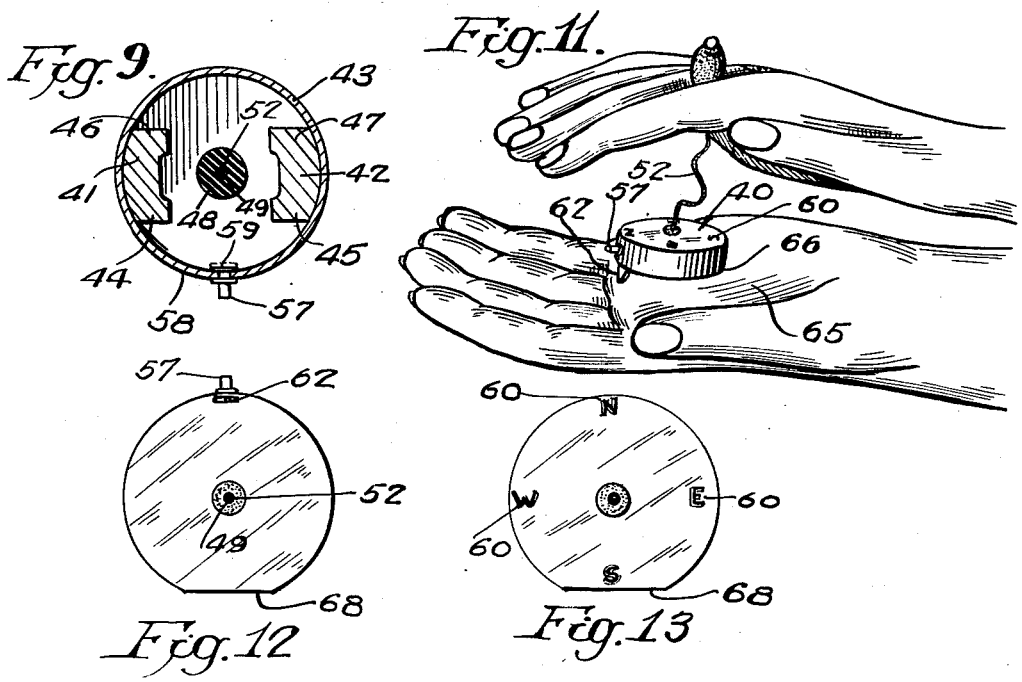
INVENTOR.
Reginald E. Beauchamp
BY
Morris Michael Marks
Attorney Patented June 13, 1950

2,511,688

UNITED STATES PATENT OFFICE 2,511,688

COMPASS

Reginald E. Beauchamp, Philadelphia, Pa.

Application March 21, 1945, Serial No. 583,866

2 Claims. (Cl. 33—222)

My invention relates to compasses, and it relates more particularly to compasses which are capable of indicating direction and maintaining balance regardless of the position of the mounting.

One object of my invention is to provide a compass which is capable of use by one who is blind or who for any other reason must rely on a sense of touch rather than on a sense of sight for the determination of direction.

Another object of my invention is to provide a compass which may be read from any angle, free of interference from its mounting and regardless of the position of the mounting.

A further object of my invention is to provide a compass which is rugged and reliable in operation, inexpensive to manufacture and easy to use.

With the above and other objects in view my invention consists of a magnetized unit having a substantially circular cross-section and freely rotatable about the perpendicular axis thereof; a pliant suspension line; said magnetized unit being connected along said central axis to a portion of said suspension line; and another portion of said suspension line being adapted to be held in suspension.

My invention also consists of a magnetized unit rotatable about a perpendicular axis thereof; and a tactile indicating means on said unit adapted to indicate direction.

For the purpose of illustrating my invention, I have shown in the accompanying drawings forms thereof which are at present preferred by me, since the same have been found in practice to give satisfactory and reliable results, although it is to be understood that the various instrumentalities of which my invention consists can be variously arranged and organized and that my invention is not limited to the precise arrangements and organizations of the instrumentalities as herein shown and described.

Referring to the drawings in which like reference characters indicate like parts:

Figure 1 represents a compass embodying my invention, in use by a blind man.

Figure 2 represents a compass embodying my invention being held in a proper operating position by the hand of the user.

Figure 3 represents a vertical sectional view of a compass embodying my invention.

Figure 4 represents a sectional view taken generally along lines 4—4 of Figure 3.

Figure 5 represents an enlarged view of a suspension line of modified construction, embodied in my invention.

Figure 6 represents a vertical sectional view of a compass of modified construction, embodying my invention.

Figure 7 represents a reduced view showing one step in a desired method of using a compass embodying my invention.

Figure 8 represents a vertical sectional view of a compass of modified construction embodying my invention.

Figure 9 represents a sectional view taken generally along lines 9—9 of Figure 8.

Figure 10 represents the compass illustrated in Figures 8 and 9 as held in one stage of its operation.

Figure 11 represents a diagrammatic view of the compass illustrated in Figure 10, in another stage of operation.

Figure 12 represents a bottom plan view of a compass of another modified construction embodying my invention.

Figure 13 represents a top plan view of the compass illustrated in Figure 12.

According to my invention I provide a source of a magnetic field, such as a bar magnet or a plurality of bar magnets disposed in parallel. Thus, I may provide two parallelly disposed bar magnets 15 and 16 with the respective north poles 17 and 18 of each in apposition. These bar magnets 15 and 16 are encased or nested within a sphere 19 and preferably disposed along the horizontal axis thereof. If desired, a suitable spacer member such as the aluminum bar 20 may be disposed intermediate the poles of the magnetic bars 15 and 16. A suitable retaining means such as the hook 21 is embedded in, or otherwise secured to the sphere 19, and has attached to it by tying, splicing, or by any other suitable means, a pliant suspension line such as the ray on cord 22 or the crocheted yarn 23.

To the opposite end of the suspension line 22, or the line 23, is secured a suitable holding means such as a knob 24. This knob 24 may have a passageway 25 formed through the vertical axis thereof, and of a diameter substantially greater than that of the suspension line 22, and the suspension line 22 passed therethrough and secured to a suitable ball bearing bead 26 resting against the upper edge of the knob 24.

A tactile indicating means such as the pin or pointer 28 is secured to the sphere, as by embedding the base 29 thereof within said sphere 19, along the longitudinal axis of the magnetic bars 15 and 16 and adjacent the north poles 17 and 18 thereof. If desired, suitable braille or other indicating means 30, 31 and 32 may be secured to the outer surface of the sphere 19, the indicating means 31 being disposed coaxially with the north indicating means 28 but adjacent the opposite poles of the bar magnets 15 and 16, and the index on said means 31 may be such as to indicate "south." The indicating means 30 and 32 are preferably disposed along an axis perpendicular to the axis along which the indicating means 28 and 31 are disposed and also perpendicular to the vertical axis along which the retaining means 21 is disposed. The indicating means 30 has suitable insignia thereon to indicate "east," and the indicating means 32 has suitable insignia to indicate "west." This insignia may be of braille, Moon, or other tactile type, or it may simply be an imprint or other letter formation which may be read visually.

In operation, the user preferably lifts the device by grasping the sphere 19 with the retaining means 21 disposed downwardly, until the suspension line 22 and the holding means 24 are freely suspended therefrom, as illustrated in Figure 7. The user thus permits the suspension line 22 to unwind any kinks or twists which may have accumulated on the line 22. The user then grasps the holding means 24 and swings it upwardly about the sphere 19 as an axis until the suspension line 22 stands vertically taut above the sphere 19. The user then releases the sphere 19 while retaining the compass by holding the knob 24, as shown in Figure 2. After allowing a few moments to elapse in order to permit the sphere 19 to swing until the pointer 28 is aligned with the magnetic north the user closes his fingers and palm about the sphere 19 until the pointer 28 makes tactile contact with some part of his hand. By comparing the location of the tactile contact of the pointer 28 with the location of the pressure of the sphere against his hand, the user instantly knows in what direction the magnetic north is located. Indeed, the pressure of the tactile indicator 28 against a portion of his hand tends to institute a reflex action on the part of his arm in the direction of the pointer. While the knowledge thus obtained of the direction of the magnetic north is sufficient to enable the user to determine the directions east, south and west, he may if he chooses resort to the use of the tactile indicating means 30, 31 and 32 to give him this information.

If desired, the user may accelerate the operation of the compass by interrupting the swing of the compass from the moment he releases the sphere 19 until it comes to rest at north. Thus, after releasing the sphere 19 while holding the knob 24, he may count to five and gently touch the sphere, either with the palm of the hand holding the compass, or with his other hand. He then may count to five again and gently touch it again, after which he may count to three and close his hand about the sphere to determine direction.

While for purposes of exact description the steps taken to determine direction have been minutely described, in actual operation the time required to do so is very minute, amounting to a matter of very few seconds.

In Figure 6 I have illustrated a modified construction of a compass embodying my invention wherein a ring 33 is used for holding one end of the pliant suspension line 34. The other end of the pliant suspension line 34 extends through a vertical passageway 35 disposed about the vertical axis of the sphere 36. The lower end of the pliant suspension line 34 is secured to a suitable ball-surfaced retaining means 37 which bears against the circular edge 38 at the lower mouth of the passageway 35. By this means, a longer suspension line is used, resulting in greater torsional flexibility of the suspension line. Suitable bar magnets and direction-indicating means are disposed in or about said sphere, as hereinabove described. Another means utilized in accordance with my invention for obtaining torsional flexibility is the crocheted yarn 23 illustrated in Figure 5; or a line of vertical, untwisted threads (not shown) may be used.

In Figures 8 to 11 inclusive are illustrated another modified construction embodying my invention. In this embodiment of my invention I provide a generally cylindrical inverted cup or disc 40 which may be made of aluminum, plastic or other lightweight material. Suitable bar magnets 41 and 42 are disposed in parallel adjacent the periphery 43 of said cup 40, and on opposite sides of, and equidistant from, the central axis thereof. The bar magnets 41 and 42 are disposed with their north poles 44 and 45 pointing in one direction, and their south poles 46 and 47 pointing in the opposite direction; and the magnets are secured to the inside of the cup 40 by any suitable means such as cement, embedding, or otherwise. A ferrule 48 is disposed within the cup 40 and extends therethrough concentric with the central axis thereof. The ferrule 48 has formed therethrough a narrow passageway 49 of circular cross-section and also concentric with the vertical central axis of the cup 40. A suitable encasing means such as the plate 50 is disposed within the generally circular groove formed horizontally near the lower edge of the inner wall of the cup 40, and bears against the ferrule 48 in a manner to retain said ferrule in place. A pliant suspension line 52 of a cross section substantially less than that of the passageway 49 extends through said passageway 49 and is secured to a generally ball-shaped step bearing 53 beyond the lower end of the ferrule 48; said step bearing 53 being adapted to bear against the lower mouth of the passageway 49 and to support the ferrule 48. The upper end of the pliant suspension line 52 extends through a passageway 54 formed through a holding means such as the knob 55. A suitable bearing such as the ball 56 is secured to the upper end of the pliant suspension line 52, and is adapted to bear against the upper mouth of the passageway 54 of the knob 55. Tactile indicating means such as the pointer 57 project outwardly from the outer periphery 58 of the disc 40, and are secured thereto by any suitable means such as the head 59. If desired, suitable additional tactile or visual indicating means 60 are disposed on the upper wall 61 of the cup 40, and may consist of an embossed "N," "W," "S," "E," suitable braille or Moon indicia or any other desired symbol or legend.

If desired, a tactile indicating means such as the pointer 62 projects downwardly from the lower edge of the cup 40 along the vertical plane of the longitudinal axis of the bar magnets 41 and 42.

In operation, this compass may be held and utilized in the same manner hereinabove described with respect to the spherical compass. However, if desired, this compass may be used by a two hand operation such as is illustrated in Figures 10 and 11. By this means, the cup 40 is lifted in an upside down position with the knob 55 suspended freely to permit unkinking or unwinding of accumulated twists in the longitudinal suspension line 52. The knob 55 and the pliant suspension line 52 are then swung upwardly about the disc 40 to a vertical postion and the disc 40 is permitted to rotate freely while the hand 63 holds the knob 55 in a manner to permit free suspension of the pliant line 52. After allowing a brief period such as two or three seconds for the magnetized cup or disc to come to rest, the other hand 64 is placed beneath, and in vertical alignment with the upper hand 63, and the two hands are moved toward each other as by the upper hand 63 being lowered or the lower hand 64 being raised, or a combination of both, until the pointer 62 contacts the palm 65 of the lower hand, and the opposite end 66 of the lower edge 67 of the cup or disc 40 rests against another portion of the same palm 65. The user then has a two-point contact which he feels on the palm 65 of his hand 64, and these two points define a line indicating direction. If desired, the pointer 62 may be formed into a predesigned tactile-indicating symbol so as specifically to indicate the "north" end of the two-point contact. Thus, the pointer 62 may be so conformed as to have a relatively sharp lower end which would contrast with the soft, round heel 66 of the lower edge 67 of the disc thereby indicating that of the two types of contact, the sharper end points toward the north.

In Figures 12 and 13 are illustrated a modified construction embodying my invention, whereby the "south" end of the disc is chamfered as at 68 operably to furnish a line contact for the heel in contradistinction to the point contact 62 indicating "north."

It will thus be seen that by use of my invention, it is possible for a blind man to determine direction by a very quick and simple process, not only so, but his means for doing so are simple, rugged and virtually incapable of getting out of order or adjustment. The compass is light in weight, compact and readily carried in his pocket, while always being available for use. Moreover it is self-balancing and readily indicates direction without requiring a mechanical or auxiliary fixation.

Not only is my invention adaptable for use by the blind, but it is equally capable of use by those requiring a compass at night. Thus my invention is readily adaptable for use by soldiers, campers, foresters, or others who find it desirable or requisite to determine direction at night. Moreover, my invention is readily adaptable for use suspended from a wall or ceiling of a moving vehicle for visually indicating direction. Thus, for instance, the ring 33 could be suspended on a hook (not shown) on the wall or windshield of an automobile, and the indicating means 28, 30, 31 and 32 may be such as visually to indicate "N," "E," "S" and "W" respectively.

I am aware that the invention may be embodied in other specific forms without departing from the spirit or essential attributes thereof, and I therefore desire the present embodiments to be considered in all respects as illustrative and not restrictive, reference being had to the appended claims rather than to the foregoing description to indicate the scope of the invention.

Having thus described my invention, that I claim as new and desire to secure by Letters Patent is:

1. A compass comprising a magnetized unit having a substantially circular periphery and freely rotatable about the perpendicular axis thereof, the center of gravity of said magnetized unit being substantially along said axis; a pliant suspension line connected at one portion thereof with said magnetized unit in a manner to enable the suspension of said unit along said axis, and another portion of said suspension line being adapted to be held in suspension by a mounting the normal vertical axis of which is capable of substantial deviation from the true vertical; and tactile direction-indicating means associated with said magnetized unit.

2. A compass comprising a substantially spherical body; a magnet having longitudinally opposed north and south poles disposed within said body; pliant suspension means connected at one portion thereof to said body and adapted to suspend said body with said north and south poles disposed substantially horizontal; and tactile direction-indicating means disposed on said body.

REGINALD E. BEAUCHAMP.

REFERENCES CITED

The following references are of record in the file of this patent:

UNITED STATES PATENTS

| Number | Name | Date |
| --- | --- | --- |
| 332,780 | Blanchard | Dec. 22, 1885 |
| 455,431 | Pike | July 7, 1891 |
| 626,686 | Gillie | June 13, 1899 |
| 1,509,873 | Ordway | Sept. 30, 1924 |
| 1,986,170 | Wiegand | Jan. 1, 1935 |
| 2,277,057 | Bach | Mar. 24, 1942 |

FOREIGN PATENTS

| Number | Country | Date |
| --- | --- | --- |
| 305,250 | Germany | Apr. 18, 1918 |

OTHER REFERENCES

Bottone: "Electricity and Magnetism," pages 3–5, copyright 1893 by Whittaker & Co., New York, N. Y.